(12) United States Patent
Zheng

(10) Patent No.: US 11,027,603 B1
(45) Date of Patent: Jun. 8, 2021

(54) LATCHING STRUCTURE OF TONNEAU COVER

(71) Applicant: Guangyao Zheng, Cixi (CN)

(72) Inventor: Guangyao Zheng, Cixi (CN)

( * ) Notice: Subject to any disclaimer, the term of this patent is extended or adjusted under 35 U.S.C. 154(b) by 0 days.

(21) Appl. No.: 17/123,144

(22) Filed: Dec. 16, 2020

(30) Foreign Application Priority Data

Aug. 21, 2020 (CN) .......................... 202010849997.3

(51) Int. Cl.
*B60J 7/14* (2006.01)
*B60J 7/16* (2006.01)
*B60J 7/19* (2006.01)

(52) U.S. Cl.
CPC ............. *B60J 7/141* (2013.01); *B60J 7/1607* (2013.01); *B60J 7/198* (2013.01)

(58) Field of Classification Search
CPC ..... B60J 7/068; B60J 7/085; B60J 7/10; B60J 7/102; B60J 7/12; B60J 7/141; B60J 7/1607
USPC ..................... 296/98, 100.01, 100.11, 100.15
See application file for complete search history.

(56) References Cited

U.S. PATENT DOCUMENTS

| | | | | |
|---|---|---|---|---|
| 5,076,338 A | * | 12/1991 | Schmeichel | B60J 7/104 160/368.1 |
| 5,984,400 A | * | 11/1999 | Miller | B60J 7/104 296/100.15 |
| 6,234,561 B1 | * | 5/2001 | Huotari | B60J 7/10 296/100.15 |
| 9,914,344 B1 | * | 3/2018 | Stull | B60J 7/102 |
| 9,969,249 B2 | * | 5/2018 | Spencer | B60J 7/185 |
| 10,538,150 B2 | * | 1/2020 | Zichettello | B60J 7/085 |
| 2002/0096909 A1 | * | 7/2002 | Schmeichel | B60P 7/02 296/100.15 |
| 2017/0120736 A1 | * | 5/2017 | Lutzka | B60J 7/141 |
| 2019/0009657 A1 | * | 1/2019 | Carter | B60J 7/141 |
| 2019/0193537 A1 | * | 6/2019 | Lutzka | B60J 7/185 |

* cited by examiner

*Primary Examiner* — Jason S Daniels
(74) *Attorney, Agent, or Firm* — Kilpatrick Townsend & Stockton LLP

(57) ABSTRACT

A truck cover system includes a rail coupled to a wall of the truck, wherein the rail comprises a channel on a top portion of the rail and a latching slot at a side of the rail, wherein the channel extends along a longitudinal direction of the rail and is configured to couple to a cover, and the latching slot extends along the longitudinal direction of the rail; a latching insert inserted in the latching slot, wherein the latching insert comprises a first through hole and a positioning hole; a latching positioner fastened to the latching insert, wherein the latching positioner comprises a second through hole aligned with the first through hole and a positioning pin aligned with the positioning hole; a latching housing releasably latched to the latching positioner.

20 Claims, 6 Drawing Sheets

LATCHING STRUCTURE OF TONNEAU COVER

CROSS-REFERENCE TO RELATED APPLICATIONS

This application claims the priority to and benefits of Chinese Patent Application No. 202021773296.8, filed on Aug. 21, 2020, entitled with "Framework for Tonneau Cover," and Chinese Patent Application No. 202010849997.3, filed on Aug. 21, 2020, entitled with "Framework for Tonneau Cover," which are incorporated herein by reference in their entireties for all purposes.

BACKGROUND OF THE INVENTION

Truck cover system are often used to protect cargo beds of pickup trucks. Cover systems often cover all or a portion of the cargo bed such that any items stored and/or hauled in the cargo bed are protected from outside elements, as well as theft. Many conventional cover systems are releasably latched at the tailgate to a side rail of the truck to keep the cover in a tensioned configuration. To facilitate access to the cargo bed, the latching structure of the cover system may be easily released. Conventional cover systembi involves many inadequacies. Improved cover systems are desired.

BRIEF SUMMARY OF THE INVENTION

A truck cover system is proposed according to some embodiments of the present invention. The truck cover system includes: a rail coupled to a wall of the truck, wherein the rail includes a channel on a top portion of the rail and a latching slot at a side of the rail, wherein the channel extends along a longitudinal direction of the rail and is configured to couple to a cover, and the latching slot extends along the longitudinal direction of the rail. The truck cover system further includes a latching insert inserted in the latching slot, wherein the latching insert includes a first through hole and a positioning hole. The truck cover system includes a latching positioner fastened to the latching insert, wherein the latching positioner includes a second through hole aligned with the first through hole and a positioning pin aligned with the positioning hole. The truck cover system further includes a latching housing releasably latched to the latching positioner.

According to some embodiments, the first through hole and the positioning hole are disposed along a longitudinal direction of the latching insert and are spaced apart from each other.

According to some embodiments, the first through hole and the positioning hole are disposed along a direction perpendicular to a longitudinal direction of the latching insert and are spaced apart from each other.

According to some embodiments, the latching insert comprises a plurality of the first through holes and a plurality of the positioning holes.

According to some embodiments, the truck cover system further includes a bolt passing through the first through hole and the second through hole, and a nut engaging with the bolt.

According to some embodiments, the positioning hole comprises a through hole.

According to some embodiments, the positioning hole comprises a blind hole.

According to some embodiments, the positioning hole has a diameter different from that of the first through hole.

According to some embodiments, the positioning hole has the same diameter as that of the first through hole.

According to some embodiments, wherein the latching slot comprises an upper lip and a lower lip defining an opening therebetween, wherein the bolt passes through the opening.

According to some embodiments, the lower lip extends along a vertical direction, and the upper lip slants from the vertical direction.

According to some embodiments, the latching positioner comprises a slant engaging surface that engages with the upper lip of the latching slot.

According to some embodiments, the latching housing comprises a latching end, and the latching positioner comprises a latching surface at an end of the latching positioner, wherein the latching end engages the latching surface.

According to some embodiments, the latching end comprises a finger engaging the latching surface.

According to some embodiments, the latching surface comprises a protrusion at a top portion thereof.

According to some embodiments, the latching surface comprises a concave surface.

According to some embodiments, the latching housing comprises a latching tongue releasably engaged in the latching slot of the rail.

According to some embodiments, the latching insert comprises a recess to receive the latching tongue.

According to some embodiments, the latching housing comprises a latching pin coupled to the latching tongue through a spring.

According to some embodiments, the first through hole comprises a countersink to receive a head of the bolt.

Numerous benefits are achieved by way of the present invention over conventional techniques. For example, embodiments of the present invention provide a truck cover system that can improve the releasably latching of the cover in the extended configuration. For some embodiments, the cooperation between the latching housing and the latching positioner may be conveniently adjusted to vary the tension applied to the cover. The latching surface of the latching positioner can prevent the latching housing from slipping off in operation. For some embodiments, the positioning pin can make sure the latching housing and the latching positioner to be readily aligned. These and other embodiments of the invention along with many of its advantages and features are described in more detail in conjunction with the text below and attached figures.

BRIEF DESCRIPTION OF THE DRAWINGS

The accompanying drawings form a part of the present disclosure, that describe exemplary embodiments of the present invention. The drawings together with the specification will explain the principles of the invention. The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention is directed to truck bed cover systems.

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
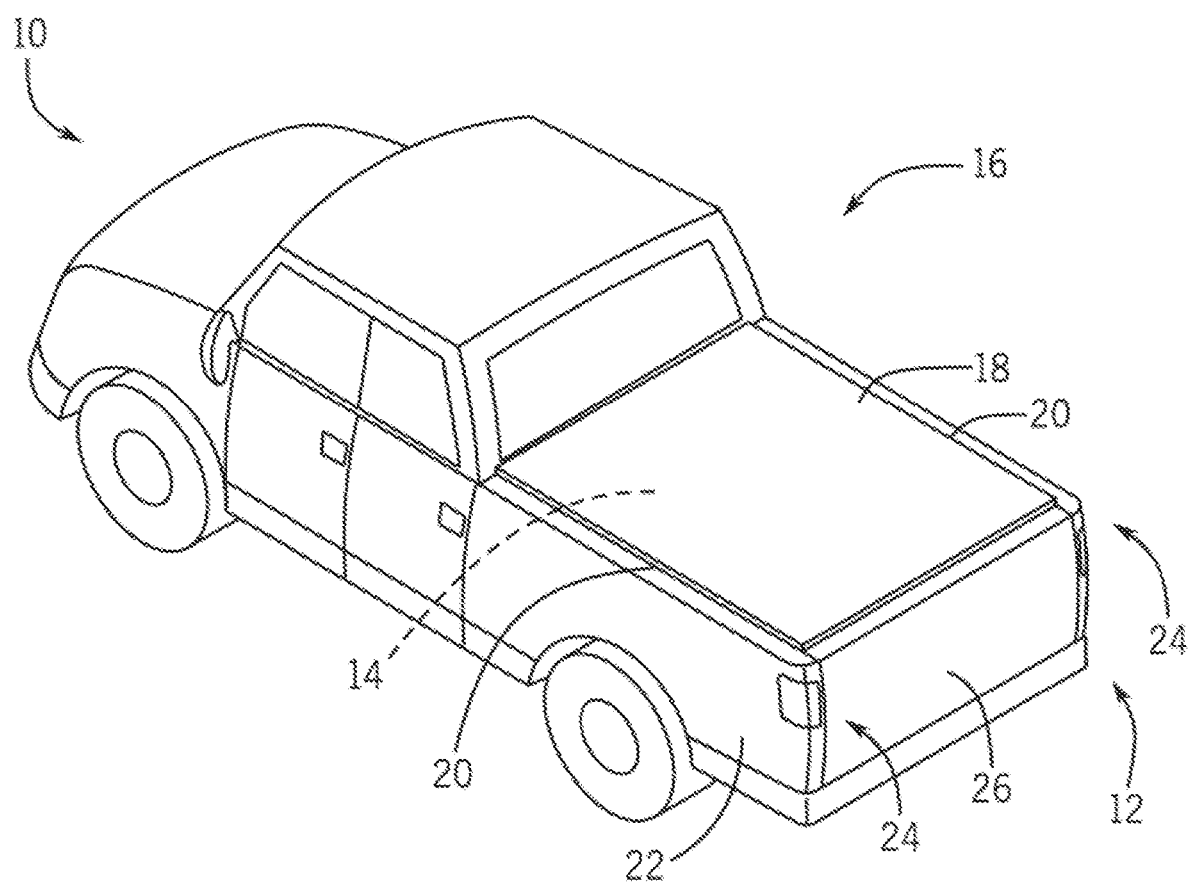
FIG. 1 is a perspective view of an embodiment of a truck with a cover system according to embodiments of the present invention.

FIG. 1 is a perspective view of an embodiment of a truck 10 with a truck cover system 12. As illustrated, the cover system 12 covers the compartment 14 formed by the truck bed 16 to protect an interior of the truck bed 16 and items that may be stored in the compartment 14. For example, the cover system 12 may block dirt and precipitation from entering the truck bed 16.

The cover system 12 includes a cover 18 (e.g., flexible cover) that extends over the compartment 14. The cover 18 may be made out of a variety of materials including fabric, plastic (e.g., vinyl), etc. The cover 18 couples to the truck bed 16 with rails 20 that in turn couple to truck walls 22 (e.g., truck bed walls). To block removal of the cover 18 and/or access to the truck bed 16, the cover system 12 includes one or more latch systems 24. For example, the cover system 12 may include two latch systems 24 one at each corner of the truck bed 16 next to the tailgate 26. In operation, the latch systems 24 couple to the rails 20 to tension/pull the cover 18 into an extended position (e.g., tensioned configuration) that facilitates the flow of precipitation off of the cover system 12 as well as enhancing the aesthetic appearance of the cover system 12.

Figure 2:
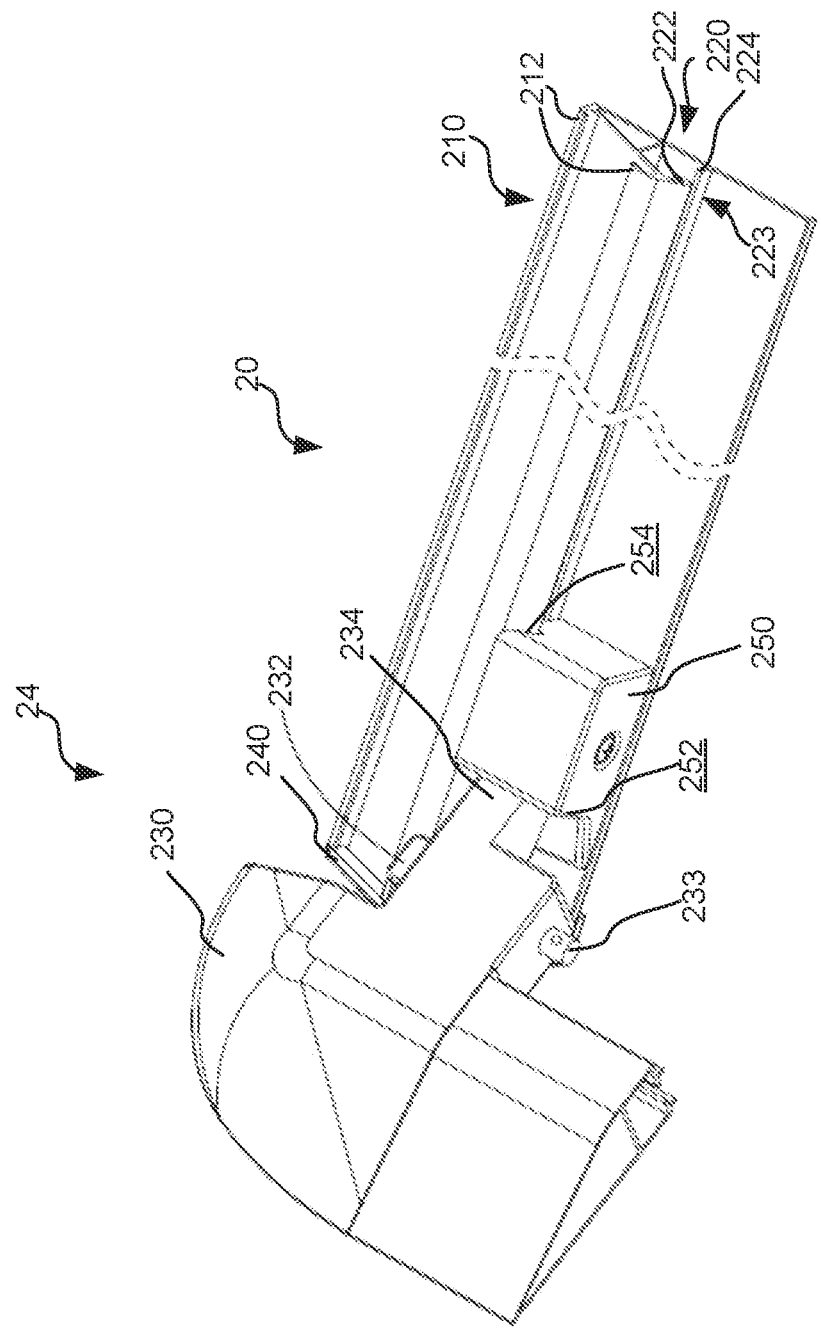
FIG. 2 is a partial rear perspective view of a latching system according to embodiments of the present invention.

FIG. 2 is a partial rear perspective view of the latch system 24 according to some embodiments. It should be noted that FIG. 2 shows rail 20 used as the left rail if viewing in the driving direction of the truck. In some embodiments, the right rail of the cover system is a mirror image of rail 20 shown in FIG. 2. As shown in FIG. 2, rail 20 extends in a longitudinal direction for a predetermined length. It should be noted that the longitudinal direction may refer to the direction parallel with the longitudinal direction of the truck. In some embodiments, rail 20 may include a channel 210 disposed on the top portion of rail 20. In some embodiments, channel 210 extends in the longitudinal direction of rail 20. In some embodiments, channel 210 is inclined outward away from the horizontal direction. In this case, the inner side (adjacent to the compartment 14 of the truck bed 16) of the channel 210 is higher than the outer side of channel 210, which facilitates the falling off of the precipitation on the cover attached to rail 20. In some embodiments, channel 210 may include retaining members 212 disposed on the opposite sides thereof. In some embodiments, channel 210 is configured to couple to cover 18 (not shown). In some embodiments, a fastening system (e.g., a hook and loop fastening system) may be disposed in channel 210 to secure cover 18 (not shown) in the extended configuration. In this case, a corresponding fastening system may be attached to cover 18 to fasten cover 18 to rail 20.

As shown in FIG. 2, rail 20 may include a latching slot 220 also extending in the longitudinal direction of rail 20. In some embodiments, latching slot 220 may include an upper lip 222 and a lower lip 224, for example, at the side adjacent to compartment 14. In some embodiments, upper lip 222 is disposed to incline away from the hollow inner portion of latching slot 220. For example, upper lip 222 is inclined toward the inner side of the truck bed. In some embodiment, the inclined upper lip 222 may engage a corresponding inclined surface 254 on a latching insert 250 (which is described below in detail) to improve the engagement. In some embodiments, lower lip 224 may extend vertically to improve positioning between rail 20 and latching positioner 250. It should be noted that the horizontal and/or vertical direction refers to the horizontal and/or direction when the truck is in normal operation. For example, the horizontal direction refers to a direction that is parallel with a driving surface on which the truck is driven, while the vertical direction refers to a direction perpendicular to the driving surface. In some embodiments, latching slot 220 defines an opening 223 between upper lip 222 and lower lip 224. The dimension of the opening 223 between upper lip 222 and lower lip 224 is reduced compared with the dimension of the cross-section of latching slot 220 due to the opposite extension of upper lip 222 and lower lip 224, thereby providing a retaining structure for latching positioner 250. In this case, latching slot 220 can secure latching system 24 in position to tension cover 18 (not shown) in the extended configuration.

In some embodiments, latching system 24 may include a latching housing 230, a latching insert 240 inserted into latching slot 220, and a latching positioner 250 fastened to latching insert 240 through latching slot 220. In some embodiments, at least a part of latching insert 240 slides from one end of rail 20 into latching slot 220. For example, a part of latching insert 240 slides from the rear end of rail 20 adjacent to the tailgate of the truck into latching slot 220.

Latching positioner 250 is fastened to latching insert 240 using fasteners. In some embodiments, latching positioner 250 also provides alignment indicia to facilitate alignment of the latching positioners 250 at the two corners of the truck bed, whereby evenly tensioning cover 18. In some embodiments, latching positioner 250 also provides adjustment to the position of the end portion of cover 18, whereby providing different tensioning to cover 18. The details of the structures of latching positioner 250 and latching insert 240 are described below.

As shown in FIG. 2, latching positioner 250 may include a latching surface 252 at one end thereof, which receives an end of the latching housing 240 to provide a tensioning effect to cover 18 (not shown). In some embodiments, the upper portion of latching surface 252 may include a small protrusion 259 (shown in FIG. 4) to improve the latching effect with latching housing 230. Latching positioner 250 may include an inward inclined surface 254 on a side engaging latching slot 220. For example, the side engaging latching slot 220 may be the outer side distant from the compartment 14 of the truck bed 16 (shown in FIG. 1). The inward inclined surface 254 may engage upper lip 222 of latching slot 220 in the assembled state of the latching system 24.

As shown in FIG. 2, latching housing 230 may include a latching tongue 232 driven by a latching pin 233. In some embodiments, a spring (not shown) is sleeved on the latching pin 233 to provide a driving force to latching pin 233. It should be noted that FIG. 2 shows the latching system 24 in the unlatched position, where the latching tongue 232 is driven by the spring to an extended position. Latching tongue 232 may snap into latching slot 220 to retain latching housing 230 in position when tensioning cover 18 (not shown) to the extended configuration to prevent unintentional release of the latching housing 230 from latching positioner 250. When it is desired to release latching housing 230 from latching positioner 250 in order to store cover 18 in a stowed position, one can drive latching pin 233 to retract latching tongue 232 out of latching slot 220.

As shown in FIG. 2, latching housing 230 may include a latching end 234, which may engage latching surface 252 of latching positioner 250. For example, latching end 234 may be the front end of latching housing 230. In some embodiments not shown, latching end 234 may include a finger on the top portion thereof, which may facilitate the latching effect between latching end 234 and latching surface 252. In some embodiments, the latching effect is further improved when latching end 234 includes the finger, and latching surface 252 includes the protrusion 259 (shown in FIG. 4).

Figure 3:
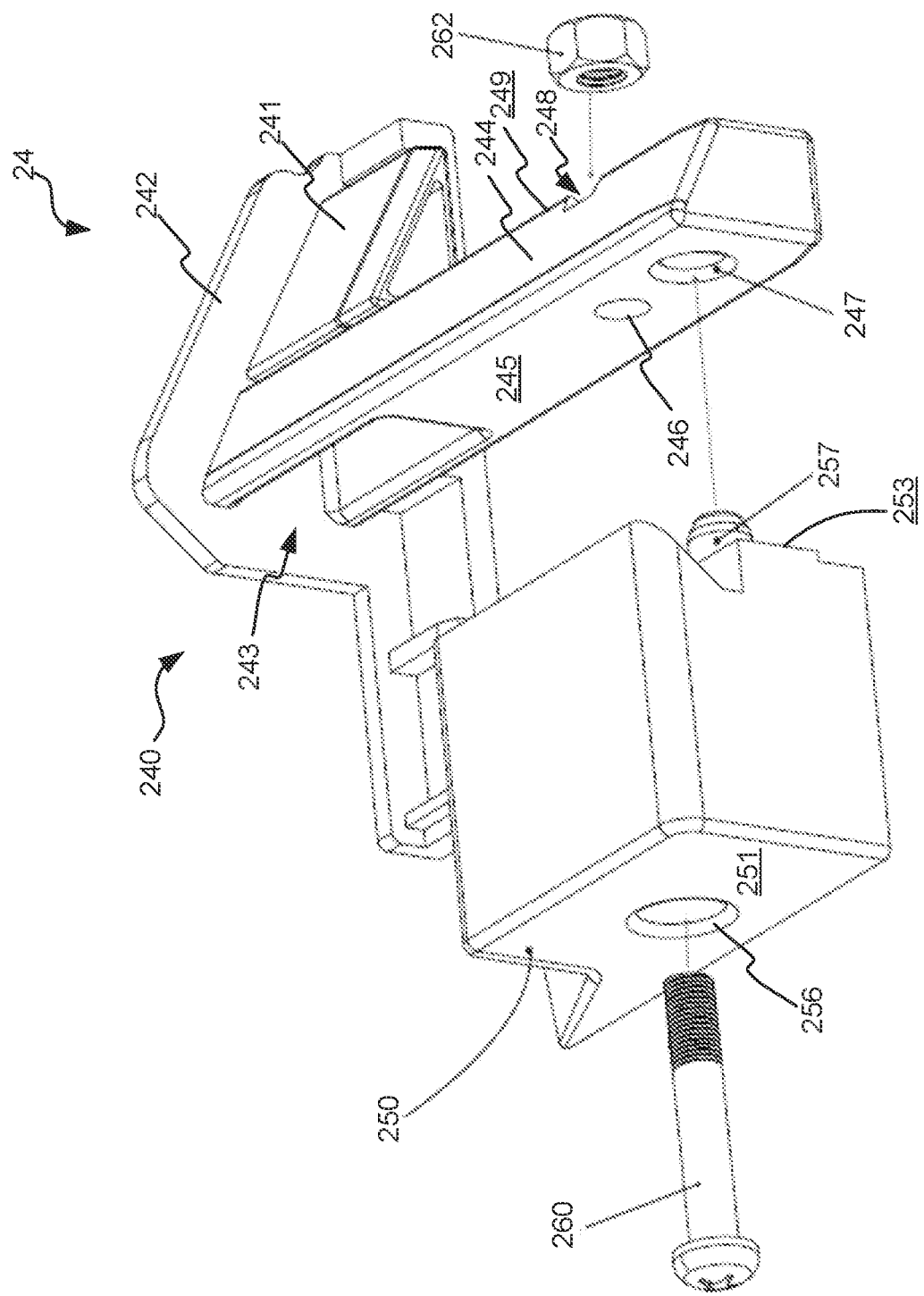
FIG. 3 shows a partially exploded view of a latching system according to embodiments of the present invention.

FIG. 3 shows a partially exploded view of latching system 24, illustrating latching positioner 250 and latching insert 240. As shown in FIG. 3, latching insert 240 may include an end plate 242 at one end thereof, and an insert body 244 extending from end plate 242. For example, end plate 242 may be disposed at the rear end of latching insert 240, while insert body 244 may extend in the longitudinal direction of rail 20 (shown in FIG. 2). In some embodiments, end plate 242 may cover the end of rail 20 to prevent debris or other foreign materials from entering into latching slot 220 of rail 20. In some embodiments, latching insert 240 may be formed as a one-piece structure to improve its strength. In some other embodiments, end plate 242 and insert body 244 may be formed separately. Then end plate 242 and insert body 244 may be coupled together using adhesive or glue. In some embodiments, endplate 242 and insert body 244 may also be coupled together using welding or soldering processes. In some embodiments, additional components may be disposed on end plate 242 to provide additional functions. For example, a reinforcing stub 241 may extend from end plate 242, which may slide into a corresponding slot disposed in rail 20 to provide additional structural reinforcement. In some embodiments, the cross-section of insert body 244 may conform with the cross-section of latching slot 220 (shown in FIG. 2) and can fit in the latching slot 220. Insert body 244 may include an engaging surface 245 that may engage upper lip 222 and lower lip 224 of latching slot 220 when insert body 244 slides into latching slot 220.

As shown in FIG. 3, a through hole 246 is disposed in insert body 244 that is opened from engaging surface 245. In some embodiments, through hole 246 may extend horizontally in a crosswise direction when latching system 24 is in operation. In some embodiments, a positioning hole 247 is disposed in insert body 244. In some embodiments, positioning hole 247 is disposed side by side with through hole 246 along the longitudinal direction of latching insert 240, that is along the longitudinal direction of rail 20, and spaced apart from each other. In some embodiments not shown, positioning hole 247 may be disposed side by side with through hole 246 along a direction perpendicular with the longitudinal direction of latching insert 240 and are spaced apart from each other. It should be noted that the relative position between through hole 246 and positioning hole 247 may vary as appropriate according to particular applications, and it should not be limited to the positions as shown in FIG. 3.

In some embodiments, positioning hole 247 may be designed as a through hole. In some other embodiments, positioning hole 247 may be designed as a blind hole opened from engaging surface 245. In some embodiments, positioning hole 247 may have a diameter different from that of through hole 246. In some other embodiments, positioning hole 247 may have the same diameter as that of through hole 246. In some embodiments, the distance of through hole 246 from end plate 242 may be designed according to the particular applications. In some embodiments not shown, insert body 244 may include a plurality of through holes 246 spaced apart from each other along the longitudinal direction of latching insert 240. In such case, insert body 244 provide different positioning for latching positioner 250 along the longitudinal direction of rail 20. In some embodiments not shown that includes a plurality of through holes 246, one through hole 246 may be used as the positioning hole for the adjacent through hole 246, provided the distance between through holes 246 remain the same. In some embodiments not shown that includes a plurality of through holes 246, insert body 244 may also include a plurality of positioning holes 247. In such case, each through hole 246 may have its own positioning hole 247. In such case, a pair of through hole 246 and positioning hole 247 may be disposed side by side along the direction perpendicular to the longitudinal direction of latching insert 240. In such case, the distance between adjacent through holes 246 may not be designed evenly, rather varies as appropriate according to particular applications.

As shown in FIG. 3, insert body 244 may include a recess 243 opened from surface 245. In some embodiments, recess 243 may receive latching tongue 232 of latching housing 230 (shown in FIG. 2) when latching housing 230 engages latching positioner 250.

As shown in FIG. 3, latching positioner 250 may include a through hole 256 extending in the same direction as through hole 246 in insert body 244. For example, through hole 256 is aligned with through hole 246. A bolt 260 may pass through hole 256 and through hole 246 and engage with a nut 262 to fasten the latching positioner 250 with insert body 244 when insert body 244 slides into latching slot 220 of rail 20. In this case, bolt 260 also passes through the opening 233 defined in latching slot 220, with upper lip 222 and lower lip 224 interposed between latching positioner 250 and latching insert 240. In some embodiments, through hole 256 may include a countersink hole. In such case, the head of bolt 260 may remain level with a side surface 251 of latching positioner 250 that is adjacent to the compartment 14 of the truck bed 16. The cooperation between bolt 260 and nut 262 may provide the desired latching effect between latching positioner 250 and rail 20 while avoiding excessive fastening pressure applied to rail 20 that causes deformation thereof.

In some embodiments, insert body 244 may include a notch 248 on a side surface 249 opposite side surface 245. Notch 248 can receive nut 262. In some embodiments, latching positioner 250 may include a positioning pin 257 extending from a side surface 253 opposite side surface 251. In some embodiments, positioning pin 275 is aligned with positioning hole 247 in insert body 244. Positioning pin 257 may insert into positioning hole 247 in insert body 244 when latching positioner 250 engages with insert body 244. In some embodiments, positioning pin 257 may improve the positioning between latching positioner 250 and rail 20.

Figure 4:
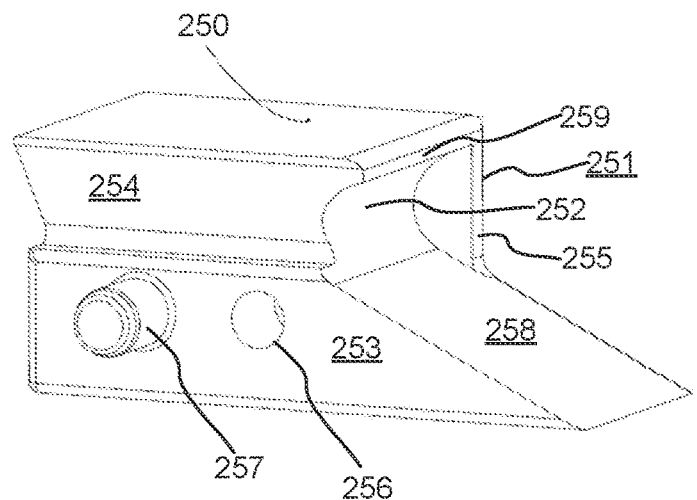
FIG. 4 is a perspective view of the latching positioner according to embodiments of the present invention.

FIG. 4 is a perspective view of latching positioner 250 according to some embodiments. As shown in FIG. 4, latching positioner 250 may include a latching surface 252, which is structured as a concave surface. In some embodiments, latching positioner 250 may include a side plate 255 extending along side surface 251. In some embodiments, side plate 255 is disposed at an inner side of latching positioner 250, which is adjacent to compartment 14 when latching positioner 250 is assembled with rail 20 (shown in FIG. 2). Side plate 255 may stop latching end 234 (shown in FIG. 2) of latching housing 230 (shown in FIG. 2) from falling laterally out of engagement with latching surface 252. In some embodiments, latching positioner 250 may include protrusion 259 disposed at the upper portion of latching surface 252. In some embodiments, protrusion 259 may have a thickness of 3 mm at the end thereof. Protrusion 259 may stop latching end 234 of latching housing 230 from disengaging upwardly from latching surface 252 in order to improve latching effect with latching housing 230. In some embodiments, latching positioner 250 may include a ramp surface 258 extending slantly downward from latching surface 252. Ramp surface 258 may facilitate retaining the engagement between latching end 234 of latching housing 230 and latching surface 252 of latching positioner 250 by preventing latching end 234 from moving downwardly.

Figure 5:
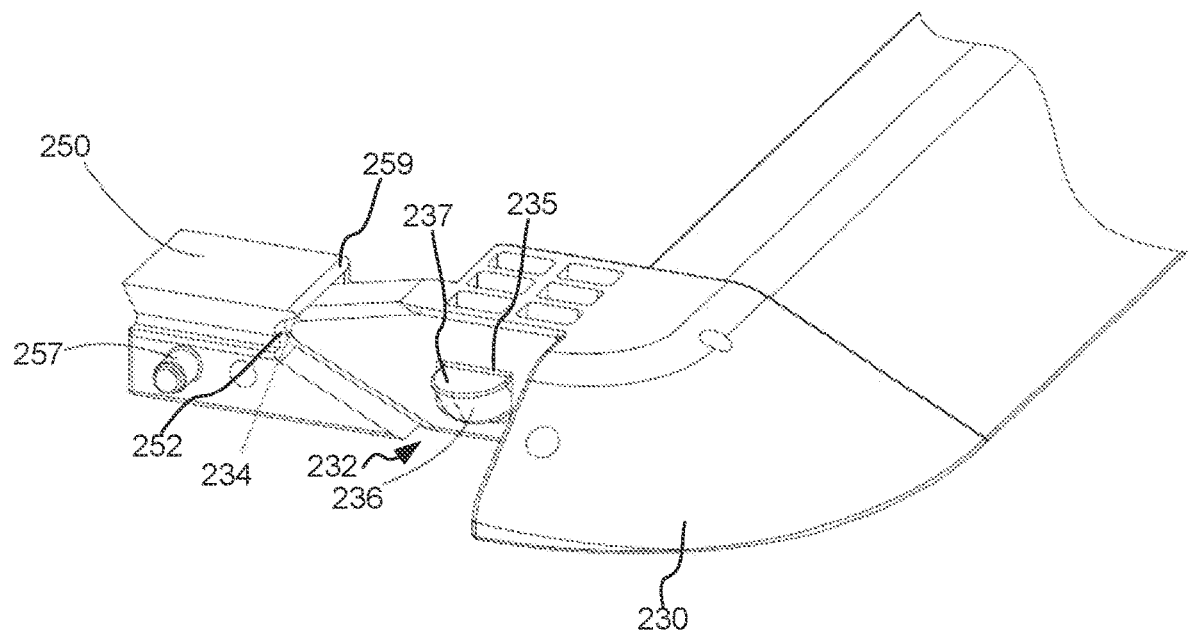
FIG. 5 is a partial perspective view of the latching system according to embodiments of the present invention.

FIG. 5 is a partial perspective view of latching system 24, illustrating latching housing 230 and latching positioner 250 in the latched position. For clarification of illustration, latching insert 240 is omitted from FIG. 5. As shown in FIG. 5, latching end 234 of latching housing 230 engages latching surface 252 of latching positioner 250. In some embodiments, latching end 234 may have a thickness of 8 mm to provide sufficient stiffness for latching end 234. In some embodiments, latching end 234 may have a round contour to facilitate latching end 334 sliding over protrusion 259 of latching positioner 250 and get into engagement with latching surface 252 of latching positioner 250. As shown in FIG. 5, latching housing 230 may include latching tongue 232 driven by latching pin 233 (shown in FIG. 2). In some embodiments, latching housing 230 may include an opening 235 disposed at a side from which latching tongue 232 may pass through and extend out of latching housing 230. In some embodiments, the upper surface 237 of latching tongue 232 is a planer surface, and the lower surface 236 of latching tongue 232 is a ramp that inclines downwardly from the upper surface 237. The ramp facilitates the snapping of latching tongue 232 into engagement with latching slot 220 (shown in FIG. 2), while the planer surface of upper surface 237 may prevent latching tongue 232 from accidentally disengaging from latching slot 220. In some embodiments, lower surface 236 may include a round contour.

Figure 6:
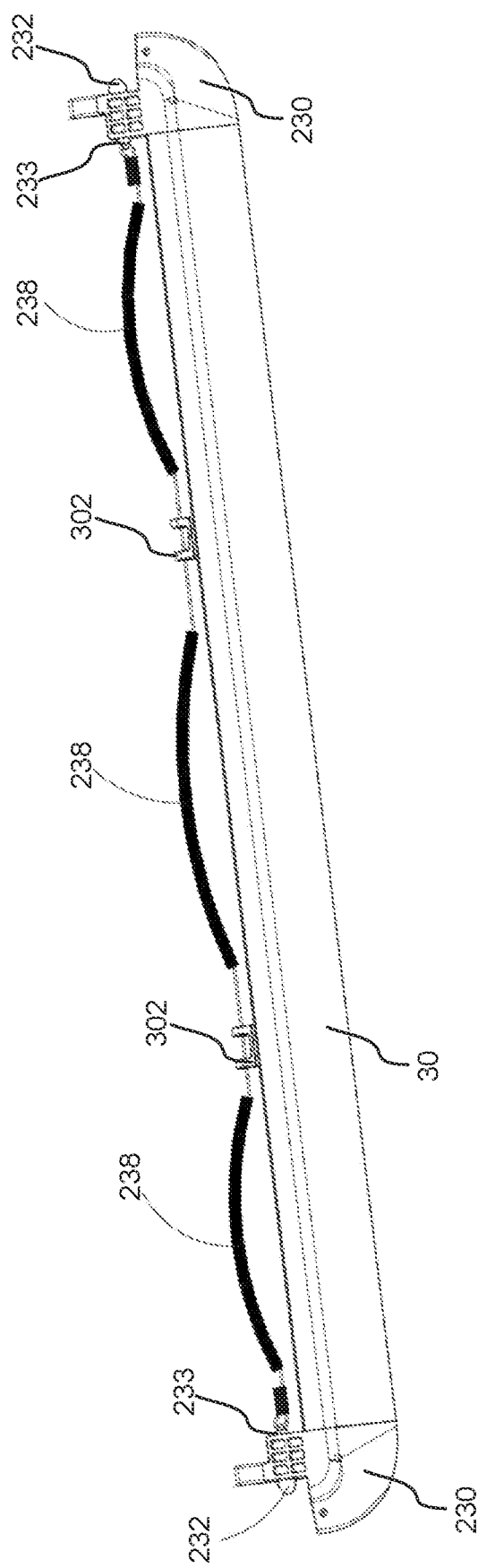
FIG. 6 is a partial perspective view of the latching system according to embodiments of the present invention.

FIG. 6 is a partial perspective view of latching system 24, illustrating latching housing 230. As shown in FIG. 6, latching system 24 may include an end rail 30 in some embodiments. In some embodiments, a latching housing 230 may be disposed at each end of end rail 30. In some embodiments, latching housing 230 may include a cord 238 attached to latching pin 233. When it is desired to release latching housing 230 from latching positioner 250 in order to store cover 18 in a stowed position, one can drive latching pin 233 by drawing cord 238 to retract latching tongue 232 out of latching slot 220. In some embodiments, end rail 30 may include an anchor structure 302 to which cord 238 is attached. In some embodiments, latching housing 230 may include a plurality of cords 238 disposed between the two latching housings 230 at both ends of end rail 30. End rail 30 may include a plurality of anchor structures 302 to anchor the plurality of cords 238. When it is desired to release latching tongue 232, one may draw any section of cords 238 away from end rail 30 in a direction substantially perpendicular to the longitudinal direction of end rail 30.

Figure 7:
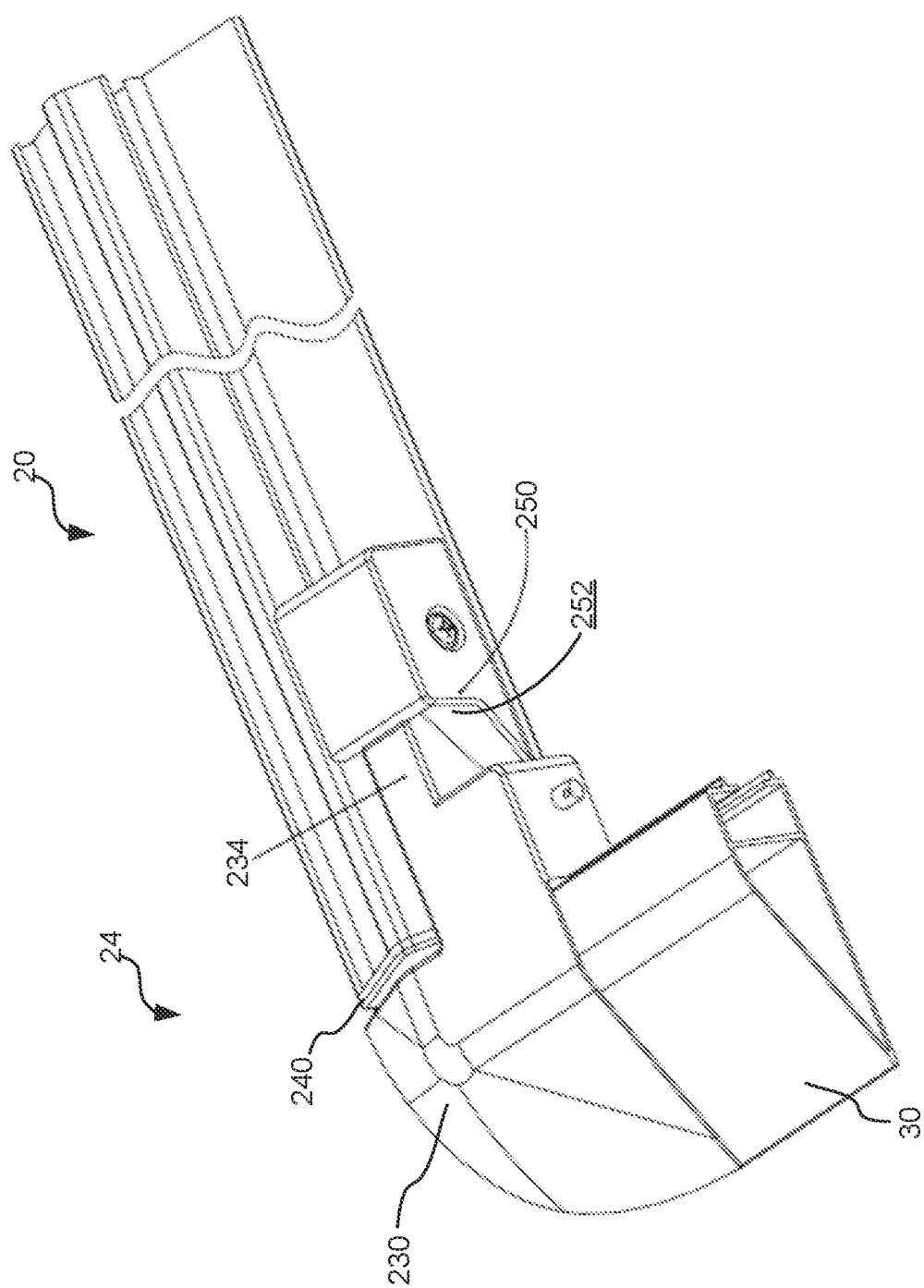
FIG. 7 is a partial rear perspective view of the latching system according to embodiments of the present invention.

FIG. 7 is a partial rear perspective view of latching system 24, illustrating latching housing 230 and latching positioner 250 in the latched position. As shown in FIG. 7, latching end 234 of latching housing 230 engages latching surface 252 of latching positioner 250. In some embodiments, latching surface 252 of latching positioner 250 may be structured as a planer surface. Thanks to the latching tongue 232 (shown in FIG. 6) snaping into latching slot 220 (shown in FIG. 2), latching end 234 of latching housing 230 could not disengage unintentionally from latching surface 252 of latching positioner 250.

While the above is a full description of the specific embodiments, various modifications, alternative constructions and equivalents may be used. Therefore, the above description and illustrations should not be taken as limiting the scope of the present disclosure which is defined by the appended claims.

What is claimed is:

1. A truck cover system, comprising:
   a rail coupled to a wall of a truck, wherein the rail comprises a channel on a top portion of the rail and a latching slot at a side of the rail, wherein the channel extends along a longitudinal direction of the rail and is configured to couple to a cover, and the latching slot extends along the longitudinal direction of the rail;
   a latching insert inserted in the latching slot, wherein the latching insert comprises a first through hole and a positioning hole;
   a latching positioner fastened to the latching insert, wherein the latching positioner comprises a second through hole aligned with the first through hole and a positioning pin aligned with the positioning hole; and
   a latching housing releasably latched to the latching positioner.

2. The truck cover system of claim 1, wherein the first through hole and the positioning hole are disposed along a longitudinal direction of the latching insert and are spaced apart from each other.

3. The truck cover system of claim 1, wherein the first through hole and the positioning hole are disposed along a direction perpendicular to a longitudinal direction of the latching insert and are spaced apart from each other.

4. The truck cover system of claim 1, wherein the latching insert comprises a plurality of the through holes and a plurality of positioning holes, the plurality of through holes including the first through hole.

5. The truck cover system of claim 1, further comprising a bolt passing through the first through hole and the second through hole, and a nut engaging with the bolt.

6. The truck cover system of claim 5, wherein the first through hole comprises a countersink hole to receive a head of the bolt.

7. The truck cover system of claim 5, wherein the latching slot comprises an upper lip and a lower lip defining an opening therebetween, wherein the bolt passes through the opening.

8. The truck cover system of claim 7, wherein the lower lip extends along a vertical direction, and the upper lip inclines from the vertical direction.

9. The truck cover system of claim 8, wherein the latching positioner comprises an inclined engaging surface that engages with the upper lip of the latching slot.

10. The truck cover system of claim 1, wherein the positioning hole comprises a through hole.

11. The truck cover system of claim 1, wherein the positioning hole comprises a blind hole.

12. The truck cover system of claim 1, wherein the positioning hole has a diameter different from that of the first through hole.

13. The truck cover system of claim 1, wherein the positioning hole has a same diameter as that of the first through hole.

14. The truck cover system of claim 1, wherein the latching housing comprises a latching end, and the latching positioner comprises a latching surface at an end of the latching positioner, wherein the latching end engages the latching surface.

15. The truck cover system of claim 14, wherein the latching end comprises a finger engaging the latching surface.

16. The truck cover system of claim 14, wherein the latching surface comprises a protrusion at a top portion thereof.

17. The truck cover system of claim 14, wherein the latching surface comprises a concave surface.

18. The truck cover system of claim 1, wherein the latching housing comprises a latching tongue releasably engaged in the latching slot of the rail.

19. The truck cover system of claim 18, wherein the latching insert comprises a recess to receive the latching tongue.

20. The truck cover system of claim 18, wherein the latching housing comprises a latching pin coupled to the latching tongue through a spring.

* * * * *